US009006336B2

(12) United States Patent
Yang et al.

(10) Patent No.: US 9,006,336 B2
(45) Date of Patent: Apr. 14, 2015

(54) CURABLE POLYSILOXANE COATING COMPOSITION

(71) Applicant: 3M Innovative Properties Company, St. Paul, MN (US)

(72) Inventors: Yu Yang, Eden Prairie, MN (US); George G. I. Moore, Afton, MN (US); Michael A. Semonick, White Bear Lake, MN (US); John L. Battiste, Northfield, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/368,514

(22) PCT Filed: Dec. 13, 2012

(86) PCT No.: PCT/US2012/069363
§ 371 (c)(1),
(2) Date: Jun. 25, 2014

(87) PCT Pub. No.: WO2013/101477
PCT Pub. Date: Jul. 4, 2013

(65) Prior Publication Data

US 2014/0378608 A1 Dec. 25, 2014

Related U.S. Application Data

(60) Provisional application No. 61/581,326, filed on Dec. 29, 2011.

(51) Int. Cl.

| | |
|---|---|
| ***C09D 183/06*** | (2006.01) |
| ***C08G 77/38*** | (2006.01) |
| ***B05D 3/06*** | (2006.01) |
| ***B05D 3/02*** | (2006.01) |
| ***C09D 183/04*** | (2006.01) |
| ***C08G 77/08*** | (2006.01) |
| ***C08L 83/04*** | (2006.01) |
| *C08G 77/12* | (2006.01) |
| *C08G 77/16* | (2006.01) |

(52) U.S. Cl.
CPC ............ *C09D 183/06* (2013.01); *C09D 183/04* (2013.01); *C08G 77/08* (2013.01); *C08G 77/12* (2013.01); *C08G 77/16* (2013.01); *C08L 83/04* (2013.01); *B05D 3/0254* (2013.01); *B05D 3/067* (2013.01); *C08G 77/38* (2013.01)

(58) Field of Classification Search
None
See application file for complete search history.

(56) References Cited

U.S. PATENT DOCUMENTS

| | | | |
|---|---|---|---|
| 2,708,289 | A | 5/1955 | Collings |
| 3,328,482 | A | 6/1967 | Northrup et al. |
| 3,445,417 | A | 5/1969 | Layne et al. |
| 3,628,996 | A | 12/1971 | Weber |
| 3,969,543 | A | 7/1976 | Roberts et al. |
| 4,181,752 | A | 1/1980 | Martens et al. |
| 4,262,157 | A | 4/1981 | Hori et al. |
| 4,269,963 | A | 5/1981 | Homan et al. |
| 4,489,199 | A | 12/1984 | Wengrovius |
| 4,515,932 | A | 5/1985 | Chung |
| 4,761,443 | A | 8/1988 | Lopes |
| 5,219,958 | A | 6/1993 | Noomen et al. |
| 5,229,212 | A | 7/1993 | Reed |
| 5,286,815 | A | 2/1994 | Leir et al. |
| 5,371,162 | A | 12/1994 | Konings et al. |
| 5,403,909 | A | 4/1995 | Rubinsztajn |
| 5,484,873 | A | 1/1996 | Johnson |
| 5,688,888 | A | 11/1997 | Burkus, II et al. |
| 5,789,460 | A | 8/1998 | Harkness et al. |
| 5,820,944 | A | 10/1998 | Harkness et al. |
| 5,866,222 | A | 2/1999 | Seth et al. |
| 5,891,529 | A | 4/1999 | Harkness et al. |
| 6,013,682 | A | 1/2000 | Dalle et al. |
| 6,096,483 | A | 8/2000 | Harkness et al. |
| 6,124,371 | A | 9/2000 | Stanssens et al. |
| 6,136,996 | A | 10/2000 | Rubinsztajn et al. |
| 6,166,207 | A | 12/2000 | Friedrich et al. |
| 6,204,350 | B1 | 3/2001 | Liu et al. |
| 6,235,832 | B1 | 5/2001 | Deng et al. |
| 6,277,986 | B1 | 8/2001 | Hall-Goulle et al. |
| 6,551,761 | B1 | 4/2003 | Hall-Goulle et al. |
| 6,740,717 | B2 | 5/2004 | Moren |

(Continued)

FOREIGN PATENT DOCUMENTS

| | | | |
|---|---|---|---|
| EP | 0 444 633 | A2 | 9/1991 |
| JP | 61022094 | A | 1/1986 |

(Continued)

OTHER PUBLICATIONS

Nolan et al. "Quantifying and understanding the electronic properties of N-heterocyclic carbenes" Chem. Soc. Rev. 2013, 42, 6723-6753.*
Wolfgang A. Herrmann "N-Heterocyclic Carbenes: A New Concept in Organometallic Catalysis" Angew. Chem. Int. Ed. 2002, 41, 1290-1309.*
Arenivar, "Bismuth Carboxylates for Polyurethane Catalysis," *Polyurethanes 89*, Proceedings of the SPI 32nd Annual Technical Marketing Conference, Oct. 1-4, 1989, pp. 623-627.
Fournier et al., "1,8-Diazabicyclo[5.4.0]undec-7-ene (DBU) as Ligand for Atom Transfer Radical Polymerization (ATRP)," *European Polymer Journal*, vol. 41 (2005), pp. 1576-1581.

(Continued)

*Primary Examiner* — Robert S Loewe
(74) *Attorney, Agent, or Firm* — Eric E. Silverman

(57) ABSTRACT

A curable composition comprises (a) at least one polyorganosiloxane, fluorinated polyorganosiloxane, or combination thereof comprising reactive silane functionality comprising at least two hydroxysilyl moieties; (b) at least one polyorganosiloxane, fluorinated polyorganosiloxane, or combination thereof comprising reactive silane functionality comprising at least two hydrosilyl moieties; and (c) a catalyst composition comprising at least one carbene; wherein at least one of the components (a) and (b) has an average reactive silane functionality of at least three.

20 Claims, No Drawings

(56) References Cited

U.S. PATENT DOCUMENTS

| | | | |
|---|---|---|---|
| 6,777,512 B1 | 8/2004 | Sonnenschein et al. | |
| 6,780,484 B2 | 8/2004 | Kobe et al. | |
| 6,805,933 B2 | 10/2004 | Patel et al. | |
| 6,835,422 B2 | 12/2004 | Kobe et al. | |
| 7,064,173 B2 | 6/2006 | Rubinsztajn et al. | |
| 7,148,370 B1 | 12/2006 | Rubinsztajn et al. | |
| 7,300,747 B2 | 11/2007 | Okazaki et al. | |
| 7,332,541 B2 | 2/2008 | Schindler et al. | |
| 7,482,391 B1 | 1/2009 | Cross et al. | |
| 7,538,104 B2 | 5/2009 | Baudin et al. | |
| 7,563,741 B2 | 7/2009 | Brummer et al. | |
| 8,470,899 B2 | 6/2013 | Maliverney | |
| 2001/0037008 A1 | 11/2001 | Sherman et al. | |
| 2003/0139287 A1 | 7/2003 | Deforth et al. | |
| 2004/0242867 A1 | 12/2004 | Baudin et al. | |
| 2006/0014844 A1 | 1/2006 | Lim et al. | |
| 2006/0111505 A1 | 5/2006 | Schindler et al. | |
| 2006/0247341 A1 | 11/2006 | Hsieh et al. | |
| 2007/0027286 A1* | 2/2007 | Blanc-Magnard et al. | 528/31 |
| 2008/0097064 A1 | 4/2008 | Blanc-Magnard et al. | |
| 2009/0171025 A1 | 7/2009 | Matsushita et al. | |
| 2009/0299024 A1 | 12/2009 | Baceiredo et al. | |
| 2010/0036049 A1 | 2/2010 | Matsushita et al. | |
| 2010/0041810 A1 | 2/2010 | Wakabayashi et al. | |
| 2010/0168454 A1 | 7/2010 | Jiang et al. | |
| 2011/0028585 A1 | 2/2011 | Shiraishi et al. | |
| 2011/0046301 A1 | 2/2011 | Mignani et al. | |
| 2011/0098392 A1 | 4/2011 | Barrandon et al. | |
| 2011/0160454 A1 | 6/2011 | Yoo et al. | |
| 2013/0101840 A1 | 4/2013 | Yang et al. | |
| 2013/0101841 A1 | 4/2013 | Yang et al. | |
| 2013/0102728 A1 | 4/2013 | Yang et al. | |
| 2013/0178553 A1 | 7/2013 | Yang et al. | |

FOREIGN PATENT DOCUMENTS

| | | |
|---|---|---|
| WO | WO2004/022618 A1 | 3/2004 |
| WO | WO2007/149422 A2 | 12/2007 |
| WO | WO 2009/122664 A1 | 10/2009 |
| WO | WO 2010/146254 A1 | 12/2010 |
| WO | WO 2010/149869 A1 | 12/2010 |
| WO | WO 2012/003152 A1 | 1/2012 |
| WO | WO 2013/004926 A1 | 1/2013 |
| WO | WO 2013/096554 A1 | 6/2013 |
| WO | WO 2013/101742 A1 | 7/2013 |
| WO | WO 2013/106193 A1 | 7/2013 |

OTHER PUBLICATIONS

Hartman et al., Bis- and Tris(Amidine)Fluoroboron Cations and Mixed Tetrahaloborate Anions: NMR Studies of Mixed Boron Trihalide Adduct Redistribution Reactions Involving Amidines as Strong Nitrogen Bases[1], *Can. J. Chem.*, vol. 74, (1996), pp. 2131-2142.

Kim et al., "Cure Kinetics of Biphenyl Epoxy Resin System Using Latent Catalysts," *Journal of Applied Polymer Science*, vol. 81, (2001), pp. 2711-2720.

Li et al., "Novel Organic-Inorganic Hybrid Coordination Polymer [(DBU-H)($PbI_3$)]n: Synthesis, Crystallographic Structure and Quantum Chemical Investigation," *Chinese Journal of Chemistry*, vol. 23, (2005), pp. 1391-1396.

Pérez et al., "Efficient and Clean Synthesis of *N*-alkyl Carbamates by Transcarboxylation and *O*-alkylation Coupled Reactions Using a DBU-$CO_2$ Zwitterionic Carbamic Complex in Aprotic Polar Media," *Tetrahedron Letters*, vol. 43, (2002), pp. 4091-4093.

Del Sole et al., "First Evidence of Formation of Stable DBU Zn-Phthalocyanine Complexes: Synthesis and Characterization," *Journal of Porphyrins and Phthalocyanines*, vol. 9, (2005), pp. 519-527.

Org. Lett. 9, No. 1, (2007), pp. 1-169.

E. Lukevics and M. Dzintara, "Silylation of Hydroxyl-Containing Compounds with Aryl and Heteroaryl-Hydrosilanes in the Presence of Amines," Journal of Organometallic Chemistry 271, pp. 307-317 (1984).

Kanji et al., "Quaternary Ammonium Salt as DBU-Generating Photobase Generator", Journal of Photopolymer Science and Technology, 19(1), 81-84 (Jan. 1, 2006).

Chemtob et al., "UV-Activated Silicone Oligomer Cross-Linking Through Photoacid and Photobase Organocatalysts," *J. Appl. Polym. Sci.* 2013, 6 pages.

Suyama et al., "Photobase Generators: Recent Progress and Application Trend in Polymer Systems," *Progress in Polymer Science* 34 (2009) pp. 194-209.

"Silicon Compounds: Silanes and Silicones," Second Edition, edited by B. Arkles and G. Larson, Gelest, Inc. (2008).

"Peel Adhesion of Pressure Sensitive Tape," Pressure Sensitive Tape Council PSTC-101 Method D (Rev May 2007).

International Search Report for PCT Application No. PCT/US2012/069363, filed Dec. 13, 2012, 4 pp.

Grasa et al., "Efficient Transesterification/Acylation Reactions Mediated by *N*-Heterocyclic Carbene Catalysts," *J. Org. Chem.*, vol. 68, No. 7, (2003), pp. 2812-2819.

H. Wanzlick in *Organic Syntheses*, Coll. vol. 5, p. 115 (1973).

Csihony et al., "Single-Component Catalyst/Initiators for the Organocatalytic Ring-Opening Polymerization of Lactide," *J. Am. Chem. Soc.*, 127, (2005), pp. 9079-9084.

Herrmann, "N-Heterocyclic Carbenes: A New Concept in Organometallic Catalysis", *Angewandte Chemie. International Edition*, vol. 41, No. 8, Jan. 1, 2002, pp. 1291-1309.

Enders et al., "Organocatalysis by N-Heterocyclic Carbenes," *Chem. Rev.*, vol. 107, No. 12, (2007), pp. 5606-5655.

Diez-González et al., "N-Heterocyclic Carbenes in Late Transition Metal Catalysis," *Chem. Rev.*, vol. 109, No. 8, (2009), pp. 3612-3676.

Enders et al., "Preparation and Application of 1,3,4-Triphenyl-4,5-dihydro-1*H*-1,2,4-triazol-5-ylidene, A Stable Carbene," *Synthesis 2003*, No. 8, (2003), pp. 1292-1295.

Potts et al., "meso Ionic Compounds. II. Derivatives of the s-Triazole Series," *J. Org. Chem.*, vol. 32, (1967), pp. 2245-2252.

* cited by examiner

CURABLE POLYSILOXANE COATING COMPOSITION

STATEMENT OF PRIORITY

This application claims the priority of U.S. Provisional Application No. 61/581,326, filed Dec. 29, 2011; the contents of which are hereby incorporated by reference.

FIELD

This invention relates to curable coating compositions comprising reactive silane functionality and, in other aspects, to processes for coating the compositions and articles prepared thereby.

BACKGROUND

Moisture-curable polysiloxane compositions cure in the presence of moisture to form crosslinked materials such as release coatings and surface treatments that are useful in many industries. For example, a polysiloxane or fluorinated polysiloxane is often selected to provide moisture-curable release coatings suitable for use with pressure-sensitive adhesives. The moisture for curing is typically obtained from the atmosphere or from a substrate to which the composition has been applied, although it can also be added to the composition (for example, to enable curing in depth or in confinement).

Moisture-curable polysiloxane compositions usually comprise siloxane polymers having groups (for example, alkoxysilyl or acyloxysilyl moieties) that can react in the presence of moisture to form cured (that is, crosslinked) materials. Moisture-curable compositions comprising alkoxysilyl or acyloxysilyl functionality typically cure in two reactions. In the first reaction, the alkoxysilyl or acyloxysilyl groups hydrolyze in the presence of moisture and a catalyst to form silanol compounds having hydroxysilyl groups. In the second reaction, the hydroxysilyl groups condense with other hydroxysilyl, alkoxysilyl, or acyloxysilyl groups in the presence of a catalyst to form —Si—O—Si— linkages. The two reactions occur essentially simultaneously upon generation of the silanol compound. Commonly used catalysts for the two reactions include Bronsted and Lewis acids. A single material can catalyze both reactions.

Preferably, the hydrolysis and condensation reactions proceed quickly after the moisture-curable composition has been applied, for example, to a substrate. At the same time, however, the reactions must not occur prematurely, for example, during processing or storage.

A good balance between these properties is often difficult to obtain, as rapid reactivity and storage stability are opposite properties to each other. For example, highly active catalysts such as tetraalkyl titanate esters rapidly accelerate the moisture-curing reaction but, at the same time, can make it difficult to process the materials without risking premature gelation in feed tanks, coating equipment, and other manufacturing and handling apparatus. Control of the amount of moisture can be critical, with too little moisture potentially resulting in slow or incomplete cure and too much moisture resulting in premature cure.

A variety of approaches have been used for providing moisture-curable compositions that have acceptable cure rates without processing and storage difficulties. For example, two-part systems have been developed (one part comprising a functional siloxane polymer and the other part comprising a catalyst), with the two parts being mixed immediately prior to use. While this approach has been useful in small-scale applications, it has been less efficient for large-scale manufacturing, where delays caused by having to mix the two parts have been undesirable. Furthermore, coating operations must be completed expeditiously before the composition cures in the pot, and this has been difficult when working with large surface area substrates or a large volume of composition.

Ammonium salt catalysts have been developed that are inactive until heated sufficiently to liberate an acid compound that initiates the moisture curing reaction. Liberation of the acid also generates an amine, however, that must be removed by evaporation. In addition, the heat used to activate the catalyst can damage heat-sensitive substrates onto which the composition has been applied.

Other materials (for example, onium salts such as sulfonium and iodonium salts) have been used to generate acid species in situ upon irradiation (for example, irradiation with ultraviolet light). Such materials have not required heat activation and therefore have enabled the use of heat-sensitive substrates without damage (and without the production of undesirable species requiring removal), but the materials have been relatively expensive, have exhibited cure inhibition on some substrates, and have required moisture control and the use of coating equipment with irradiation capability.

Conventional tin catalysts such as dibutyl tin dilaurate can provide stable curable polysiloxane compositions that can be processed and coated without premature gelation. In addition to typical moisture-curable systems, it has been found that curable compositions comprising dual reactive silane functionality in the form of hydrosilyl and hydroxysilyl groups (dehydrogenatively-curable systems) can be cured by using tin catalysts. The compositions have been widely used for pressure-sensitive adhesive and mold release applications but have sometimes suffered from relatively short pot lives. In addition, the use of tin catalysts is becoming particularly problematic because the organotin compounds generally employed as catalysts are now considered to be toxicologically objectionable.

Acceleration of cure has been achieved by the use of compounds such as diorganosulfoxides, imidazoles, and amines (including amidines and substituted guanidines) in combination with tin catalysts (and, in some cases, amine compounds alone) in various silicone compositions (including room temperature vulcanizing silicone compositions and dehydrogenatively-cured silicone compositions). Amine compounds including amidines have also been proposed for use in the absence of tin catalysts for curing moisture-curable, silyl-functional organic polymers, but practical curability of alkoxysilyl-functional organic polymers and acceptable adhesion to substrates were achieved only with strongly basic amines (those exhibiting a pH of at least 13.4 in aqueous solution).

Carbenes have been used as catalysts in various types of reactions including the synthesis of urethanes (by reaction of hydroxyl and isocyanate functionalities), ring-opening polymerization of lactide, bezoin condensation (formation of carbon-carbon bonds), transesterification (formation of carbon-oxygen bonds), and condensation of hydroxysilyl and alkoxysilyl groups. Metal-carbene complexes have been used to catalyze the crosslinking of silicones by hydrosilylation. The use of carbenes and/or carbene complexes in the dehydrogenative or dehydrocondensation curing of silicone compositions (comprising hydroxysilyl and hydrosilyl groups), however, is believed not to have been reported.

SUMMARY

Thus, we recognize that there exists an ongoing need for curable polysiloxane compositions that can provide acceptable cure rates without significant processing and storage difficulties (for example, due to premature gelation). Preferably, these compositions will be efficiently processable (for example, without the need for mixing of a two-part system prior to cure), will employ catalysts that do not generate species requiring removal, and/or will not require high-temperature activation (so as to enable curing at relatively low temperatures and/or the use of heat-sensitive substrates). Ideally, the compositions will employ catalysts that are relatively non-toxic, provide compositions that are relatively stable in solution but relatively fast-curing upon drying, effective in relatively low concentrations, and/or effective under relatively low (or no) moisture conditions.

Briefly, in one aspect, this invention provides a curable polysiloxane composition comprising dual reactive silane functionality. The composition comprises (a) at least one polyorganosiloxane, fluorinated polyorganosiloxane, or combination thereof comprising reactive silane functionality comprising at least two hydroxysilyl moieties (that is, monovalent moieties comprising a hydroxyl group bonded directly to a silicon atom);

(b) at least one polyorganosiloxane, fluorinated polyorganosiloxane, or combination thereof comprising reactive silane functionality comprising at least two hydrosilyl moieties (that is, monovalent moieties comprising a hydrogen atom bonded directly to a silicon atom); and (c) a catalyst composition comprising at least one carbene;

wherein at least one of components (a) and (b) has an average reactive silane functionality of at least three (that is, component (a) has at least three hydroxysilyl moieties (on average), component (b) has at least three hydrosilyl moieties (on average), or both).

Components (a) and (b) preferably comprise at least one polyorganosiloxane (more preferably, at least one polyalkylsiloxane (that is, at least one polydialkylsiloxane, polyalkyl (hydro)siloxane, or a combination thereof); most preferably, at least one polymethylsiloxane (that is, at least one polydimethylsiloxane, polymethyl(hydro)siloxane, or a combination thereof)) having the above-specified reactive silane functionalities, respectively.

Preferably, component (a) is hydroxyl-endblocked, so as to comprise two terminal hydroxysilyl moieties (on average). The carbene preferably comprises at least one N-heterocyclic carbene (NHC). The composition preferably further comprises at least one solvent (for example, an aprotic organic solvent such as heptane).

It has been discovered that carbenes can effectively catalyze the curing (apparently, by dehydrocondensation) of polysiloxane compositions comprising reactive silane functionality in the form of hydrosilyl and hydroxysilyl moieties. The carbenes can be pre-formed (for example, as "naked" carbenes) or can be generated in situ from carbene precursors (for example, alcohol adducts) under relatively mild thermolysis conditions (for example, temperatures in the range of about 50 to about 120° C.) or by photolysis. The carbenes can provide relatively rapid cure (for example, upon removal of solvent curing can occur within periods of time as short as about 1 minute), and can be effective in relatively small amounts (for example, at concentrations as low as about 0.5 weight percent or less, based upon the total weight of components (a), (b), and (c)).

Thus, polysiloxane compositions comprising carbenes and/or their precursors can be suitable for use in high speed coating and curing operations in an industrial setting. In spite of such effective curability, compositions comprising carbene precursors can exhibit relatively good storage stability (for example, for a period of weeks in a closed container) and/or relatively long pot life (for example, on the order of 8 hours or more) in a variety of solvents (for example, heptane, methyl ethyl ketone, or a combination thereof), without the need for mixing of a two-part system immediately prior to use.

In surprising contrast with prior art compositions, carbenes can be effective in the curable polysiloxane composition of the invention in the substantial absence of other condensation catalysts and/or in the substantial absence of moisture. Carbenes can be used as substitutes for conventional tin catalysts to provide organometallic catalyst-free, curable polysiloxane compositions, without the need for changes in the nature of the polysiloxane components of conventional tin-cured polysiloxane compositions (for example, release coating compositions such as Syl-Off™ 292 coating composition, available from Dow Corning Corporation, Midland, Mich.). Unlike the conventional tin catalysts, at least some carbenes (for example, TPT (also known as Ender's carbene), 1,3,4-triphenyl-4,5-dihydroimidazol-2-ylidene) are relatively non-toxic, are relatively non-persistent (along with their reaction products), and are therefore suitable for use in preparing relatively environmentally friendly or "green" polysiloxane compositions.

The curable polysiloxane composition of the invention can be cured to provide crosslinked networks having properties that can be tailored to the requirements of various different applications (for example, by varying the natures, relative amounts, and/or degrees of reactive silane functionality of starting components (a) and/or (b)). Thus, the curable polysiloxane composition can be used to provide coatings having a variety of surface properties for use in numerous coating applications (for example, use as release coatings for pressure-sensitive adhesives, protective coatings, water- and/or oil-repellent coatings or surface treatments, and the like). The curable polysiloxane composition of the invention can be particularly useful in relatively sensitive applications requiring careful and/or tailored control of surface properties (for example, release coating applications), as the carbene catalysts do not appear to produce species requiring removal and, in some embodiments, the carbene catalysts (as well as their reaction products) can be sufficiently volatile to be evaporated from the composition during processing, thereby leaving essentially no catalyst contamination in the cured material (in contrast with the metal contamination of conventional tin catalysts, which can be particularly problematic in the area of electronics).

In view of the foregoing, at least some embodiments of the curable polysiloxane composition of the invention meet the above-described, ongoing need for curable compositions that can provide acceptable cure rates without significant processing and storage difficulties (for example, being relatively stable in solution but relatively fast-curing upon drying), while also being efficiently processable (for example, without the need for mixing of a two-part system prior to cure, for contaminant removal, and/or for high-temperature heat activation). At least some embodiments of the curable polysiloxane composition also employ catalysts that are relatively non-toxic, while being effective in relatively low concentrations and/or under relatively low (or no) moisture conditions.

In another aspect, this invention also provides a second curable polysiloxane composition comprising (a) at least one polyorganosiloxane, fluorinated polyorganosiloxane, or combination thereof comprising reactive silane functionality comprising at least two hydroxysilyl moieties;

(b) at least one polyorganosiloxane, fluorinated polyorganosiloxane, or combination thereof comprising reactive silane functionality comprising at least two hydrosilyl moieties; and (c) a catalyst composition comprising at least one carbene precursor; wherein at least one of components (a) and (b) has an average reactive silane functionality of at least three.

In yet another aspect, this invention also provides a coating process comprising (a) providing at least one of the above-described curable polysiloxane compositions of the invention;

(b) providing at least one substrate having at least one major surface;

(c) applying the curable polysiloxane composition to at least a portion of at least one major surface of the substrate; and (d) allowing or inducing the curable polysiloxane composition to cure to form a coating.

In still another aspect, this invention provides an article comprising at least one substrate having at least one major surface, the substrate bearing, on at least a portion of at least one major surface, a coating prepared by the above-described coating process.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

As used herein, the term "and/or" means one or all of the listed elements or a combination of any two or more of the listed elements.

The words "preferred" and "preferably" refer to embodiments of the invention that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the invention.

The term "comprises" and variations thereof do not have a limiting meaning where these terms appear in the description and claims.

As used herein, "a," "an," "the," "at least one," and "one or more" are used interchangeably.

The above "Summary of the Invention" section is not intended to describe every embodiment or every implementation of the invention. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

DEFINITIONS

As used in this patent application:

"carbene" means a chemical species (for example, an organic radical optionally comprising one or more heteroatoms) that comprises at least one divalent carbon atom having two non-bonding electrons;

"carbene precursor" means a carbene in a stabilized or masked form (for example, a carbene dimer, carbene salt, or carbene adduct) that can be activated (for example, by thermolysis, treatment with base, or photolysis) to provide the carbene (preferably, the carbene precursor is a metal-free carbene precursor);

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"cure" means conversion to a crosslinked polymer network (for example, through catalysis);

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"fluorochemical" means fluorinated or perfluorinated;

"heteroorganic" means an organic group or moiety (for example, an alkyl or alkylene group) containing at least one heteroatom (preferably, at least one catenated heteroatom);

"hydrosilyl" refers to a monovalent moiety or group comprising a silicon atom directly bonded to a hydrogen atom (for example, the hydrosilyl moiety can be of formula $—Si(R)_{3-p}(H)_p$, where p is an integer of 1, 2, or 3 and R is a hydrolyzable or non-hydrolyzable group (preferably, non-hydrolyzable) such as alkyl or aryl);

"hydroxysilyl" refers to a monovalent moiety or group comprising a silicon atom directly bonded to a hydroxyl group (for example, the hydroxysilyl moiety can be of formula $—Si(R)_{3-p}(OH)_p$ where p is an integer of 1, 2, or 3 and R is a hydrolyzable or non-hydrolyzable group (preferably, non-hydrolyzable) such as alkyl or aryl);

"mercapto" means a monovalent group or moiety of formula —SH;

"N-heterocyclic carbene" (NHC) means a cyclic carbene having at least one nitrogen atom that is directly bonded to a divalent carbon atom having two non-bonding electrons;

"oligomer" means a molecule that comprises at least two repeat units and that has a molecular weight less than its entanglement molecular weight; such a molecule, unlike a polymer, exhibits a significant change in properties upon the removal or addition of a single repeat unit;

"oxy" means a divalent group or moiety of formula —O—; and

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine.

Component (a)

Polysiloxanes suitable for use as component (a) of the curable polysiloxane compositions of the invention include polyorganosiloxanes, fluorinated polyorganosiloxanes, and combinations thereof (preferably, polyorganosiloxanes; more preferably, polydialkylsiloxanes) comprising reactive silane functionality comprising at least two hydroxysilyl moieties (that is, monovalent moieties comprising a hydroxyl group bonded directly to a silicon atom). The polysiloxanes can be oligomers, polymers, or a combination thereof. Preferably, the polysiloxanes are polymers, which can be linear, branched, or cyclic. Useful polymers include those that have random, alternating, block, or graft structures, or a combination thereof.

The molecular weight and the reactive silane functionality of component (a) (including the number and nature of the hydroxysilyl moieties) of the polysiloxanes can vary widely, depending upon, for example, the molecular weight and the reactive silane functionality of component (b) and the properties desired for the curable and/or cured composition. At least one of components (a) and (b) has an average reactive silane functionality of at least three, however (that is, component (a) has at least three hydroxysilyl moieties (on average), component (b) has at least three hydrosilyl moieties (on average), or both), so as to enable the formation of a crosslinked network.

Preferably, the polyorganosiloxanes, fluorinated polyorganosiloxanes, and combinations thereof used for component (a) are hydroxyl-endblocked, so as to comprise two terminal hydroxysilyl moieties (on average). The polysiloxanes preferably have a weight average molecular weight of about 150 to about 1,000,000 (more preferably, about 1,000 to about 1,000,000).

A preferred class of useful polysiloxanes includes those that can be represented by the following general formula:

$$(OH)_p\text{—}Si(R')_{3-p}\text{-}[G\text{-}Si(R')_2]_t\text{—}O\text{—}[(R')_2SiO]_q[Si(R')_2\text{-}G]_t\text{-}Si(R')_{3-p}\text{—}(OH)_p \quad (I)$$

wherein each p is independently an integer of 1, 2, or 3 (preferably, 1); each G is independently a divalent linking group; each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; q is an integer of 0 to about 15,000 (preferably, about 20 to about 15,000); and each t is independently an integer of 0 or 1 (preferably, 0). Preferably, each R' is independently selected from alkyl (preferably, having 1 to about 8 carbon atoms), fluoroalkyl (preferably, having 3 to about 8 carbon atoms; more preferably, $R_fC_2H_4$—, wherein $R_f$ is a fluorinated or perfluorinated alkyl group having 1 to about 6 carbon atoms (preferably, 1 to about 6 carbon atoms)), aryl, and combinations thereof (with alkyl being most preferred). More preferably, each R' is independently selected from methyl, $C_4F_9C_2H_4$—, $C_6F_{13}C_2H_4$—, $CF_3C_2H_4$—, phenyl, $C_6H_5C_2H_4$—, and combinations thereof (even more preferably, methyl, $CF_3C_2H_4$—, phenyl, $C_4F_9C_2H_4$—, and combinations thereof; most preferably, methyl). Each divalent linking group, G, is preferably independently selected from oxy, alkylene, arylene, heteroalkylene, heteroarylene, cycloalkylene, heterocycloalkylene, and combinations thereof (more preferably, selected from oxy, alkylene, arylene, and combinations thereof). Heteroatoms (in G and/or R') can include oxygen, sulfur, nitrogen, phosphorus, and combinations thereof (preferably, oxygen, sulfur, and combinations thereof; more preferably, oxygen). G can contain fluorine, provided that it is separated from silicon by at least two carbon atoms.

Preferred polysiloxanes include hydroxyl-endblocked polydimethylsiloxane homopolymer, as well as hydroxyl-endblocked copolymers comprising dimethylsiloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), di(fluoroalkyl)siloxane units, (fluoroalkyl)(methyl)siloxane units, and (fluoroalkyl)(phenyl)siloxane units wherein each fluoroalkyl group is independently selected from fluoroalkyl groups having 3 to about 8 carbon atoms (for example, trifluoropropyl or nonafluorohexyl), diphenylsiloxane units, and combinations thereof.

The polysiloxanes useful as component (a) can be used in the curable compositions of the invention singly or in the form of mixtures of different polysiloxanes. Sometimes mixtures can be preferred. A preferred composition for use as component (a) comprises a mixture of (1) at least one polyorganosiloxane, fluorinated polyorganosiloxane, or combination thereof (preferably, at least one polyorganosiloxane) having a weight average molecular weight in the range of about 300,000 to about 1,000,000 (more preferably, about 400,000 to about 900,000; most preferably, about 500,000 to about 700,000) and (2) at least one polyorganosiloxane, fluorinated polyorganosiloxane, or combination thereof (preferably, at least one polyorganosiloxane) having a weight average molecular weight in the range of about 150 to about 150,000 (more preferably, about 10,000 to about 120,000; most preferably, about 10,000 to about 15,000). The relative amounts of component (1) and component (2) and their molecular weights can be selected for release applications according to the nature of the adhesive (or other material) to be utilized and the level of release desired.

For example, for mold release applications, the weight ratio of the former polysiloxane to the latter polysiloxane can range from about 3:1 to about 19:1 (preferably, about 4:1 to about 9:1; more preferably, about 6:1). For pressure sensitive adhesive (PSA) release applications, the weight ratio of the former polysiloxane to the latter polysiloxane can range, for example, from about 2:1 to about 1:10 (preferably, about 1:1 to about 1:6; more preferably, about 1:2 to about 1:4).

The polysiloxanes suitable for use as component (a) can be prepared by known synthetic methods and many are commercially available. For example, the hydroxysilyl-functional components of Syl-Off™ 292 coating composition (available from Dow Corning Corporation, Midland, Mich.) are preferred polysiloxanes, and other useful polysiloxanes of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

Component (b)

Polysiloxanes suitable for use as crosslinker component (b) of the curable compositions of the invention include polyorganosiloxanes, fluorinated polyorganosiloxanes, and combinations thereof (preferably, polyorganosiloxanes; more preferably, polyalkyl(hydro)siloxanes) comprising reactive silane functionality comprising at least two hydrosilyl moieties (that is, monovalent moieties comprising a hydrogen atom bonded directly to a silicon atom). The polysiloxanes can be small molecules, oligomers, polymers, or a combination thereof. Preferably, the polysiloxanes are polymers. The polysiloxanes can be linear, branched, or cyclic. Useful polymers include those that have random, alternating, block, or graft structures, or a combination thereof.

The molecular weight and the reactive silane functionality of component (b) (including the number and nature of the hydrosilyl moieties) can vary widely, depending upon, for example, the molecular weight and the reactive silane functionality of component (a) and the properties desired for the curable and/or cured composition. Preferably, component (b) has an average reactive silane functionality of at least three (so as to enable the formation of a crosslinked network when component (a) is hydroxyl-endblocked). The polysiloxanes preferably have a weight average molecular weight of about 100 to about 100,000.

A preferred class of polysiloxanes includes those that can be represented by the following general formula:

$$R'_2R''SiO(R'_2SiO)_r(HR'SiO)_sSiR''R'_2 \quad (II)$$

wherein R' is as defined above for Formula (I); each R'' is independently hydrogen (hydro) or R'; r is an integer of 0 to about 150 (preferably, 0 to about 100; more preferably, 0 to about 20); and s is an integer of 2 to about 150 (preferably, about 5 to about 100; more preferably, about 20 to about 80). Most preferably, both R'' and R' are methyl, r is 0, and/or s is about 40.

Preferred hydride-functional polysiloxanes include those comprising polymethyl(hydro)siloxane homopolymer, as well as those comprising copolymer(s) comprising methyl (hydro)siloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), di(fluoroalkyl)siloxane units, (fluoroalkyl)(methyl)siloxane units, and (fluoroalkyl)(phenyl)siloxane units wherein each fluoroalkyl group is independently selected from fluoroalkyl groups having 3 to about 8 carbon atoms (for example, trifluoropropyl or nonafluorohexyl), diphenylsiloxane units, and combinations thereof. Although homopolymer is often preferred, copolymers can be preferred for some applications.

The polysiloxanes useful as component (b) can be used in the curable compositions of the invention singly or in the form of mixtures of different polysiloxanes. The polysiloxanes can be prepared by known synthetic methods and many are commercially available. For example, Syl-Off™ Q2-7560 crosslinker, Syl-Off™ 7678 crosslinker, and the hydrosilyl-functional component (for example, Syl-Off™ 7048 crosslinker) of Syl-Off™ 292 and Syl-Off™ 294 coating compositions (all available from Dow Corning Corporation, Midland, Mich.) are preferred polysiloxanes, and other useful polysiloxane crosslinkers of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

Component (c)

Carbenes suitable for use in component (c) (the catalyst composition) of the curable compositions of the invention include cyclic and acyclic carbenes (and combinations thereof) that can be introduced or generated under typical polysiloxane dehydrogenative curing conditions and that can be sufficiently reactive under those conditions to catalyze the polysiloxane dehydrogenative curing reaction. Preferred carbenes include heteroatom-containing carbenes (more preferably, carbenes comprising at least one heteroatom that is directly bonded to the carbene's divalent carbon atom bearing two non-bonding electrons; most preferably, heterocyclic carbenes comprising at least one heteroatom that is directly bonded to the carbene's divalent carbon atom bearing two non-bonding electrons). Preferably, the heteroatom(s) are selected from nitrogen, sulfur, phosphorus, silicon, oxygen, boron, and combinations thereof (more preferably, nitrogen, sulfur, phosphorus, and combinations thereof; even more preferably, nitrogen, sulfur, and combinations thereof; most preferably, nitrogen). Thus, particularly preferred carbenes are N-heterocyclic carbenes.

A class of useful carbenes is that represented by the following general formula

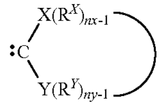

(III)

wherein X and Y are heteroatoms that are each independently selected from nitrogen, sulfur, phosphorus, silicon, boron, and oxygen; nx and ny are integers that are respectively equal to the valence of the heteroatom X and the valence of the heteroatom Y (that is, an integer of 2 when the heteroatom is sulfur or oxygen, an integer of 3 when the heteroatom is nitrogen, boron, or phosphorus, and an integer of 4 when the heteroatom is silicon); each $R^X$ and each $R^Y$ is independently selected from linear or branched hydrocarbon groups (including both saturated and unsaturated groups), linear or branched hydrocarbon groups that are partially or completely cyclized (including both saturated and unsaturated groups), linear or branched hydrocarbon groups (including both saturated and unsaturated groups) that contain at least one heteroatom (for example, such as nitrogen, sulfur, oxygen, silicon, or halogen), linear or branched hydrocarbon groups that are partially or completely cyclized (including both saturated and unsaturated groups) and that contain at least one heteroatom (for example, such as nitrogen, sulfur, oxygen, silicon, or halogen), and combinations thereof; wherein one $R^X$ and one $R^y$ optionally are bonded together to form a heterocycle with the heteroatoms X and Y and the divalent carbon atom having two non-bonding electrons (preferably, a heterocycle comprising from 5 to 7 bonds).

Preferably, X is nitrogen; one $R^X$ and one $R^Y$ are bonded together to form a heterocycle; and/or each $R^X$ and each $R^Y$ is independently selected from linear or branched alkyl (for example, methyl, ethyl, isopropyl, or tert-butyl), alkenyl, and alkynyl groups that are optionally substituted (for example, with at least one perfluoroalkyl group); linear or branched perfluoroalkyl groups; cycloalkyl groups that are optionally substituted (for example, with at least one alkyl or alkoxy group; preferably, alkyl; more preferably, isopropyl or tert-butyl); aryl groups that are optionally substituted (for example, with at least one alkyl or alkoxy group; preferably, alkyl; more preferably, isopropyl or tert-butyl); alkaryl and aralkyl groups (for example, such groups having from one to about 3 carbon atoms in the alkyl portion) in which the aryl portion is optionally substituted (for example, with at least one alkyl or alkoxy group; preferably, alkyl; more preferably, isopropyl or tert-butyl); and combinations thereof. More preferably, each $R^X$ and each $R^Y$, other than those bonded together to form a heterocycle (which are preferably independently selected from the above-described, optionally-substituted alkyl and aralkyl groups and combinations thereof), is independently selected from linear or branched (preferably, branched) alkyl groups that are optionally substituted, aryl groups that are optionally substituted, alkaryl groups in which the aryl portion is optionally substituted, and combinations thereof (even more preferably, each $R^X$ and each $R^Y$, other than those bonded together to form a heterocycle, is independently selected from aryl groups that are optionally substituted, alkaryl groups in which the aryl portion is optionally substituted, and combinations thereof; most preferably, each $R^X$ and each $R^Y$, other than those bonded together to form a heterocycle, is independently selected from aryl groups that are optionally substituted (preferably, unsubstituted) and combinations thereof). Each $R^X$ and each $R^Y$ preferably independently have from one to about 18 carbon atoms (more preferably, from one to about 10 carbon atoms; most preferably, from one to about 8 carbon atoms).

Preferred classes of carbenes include those represented by the following general formulas (IV)

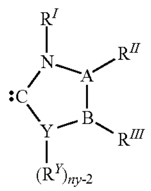

(V)

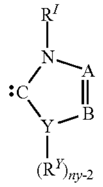

wherein Y is a heteroatom selected from nitrogen, sulfur, phosphorus, silicon, boron, and oxygen (preferably, nitrogen); $R^Y$ and ny are as defined above for Formula III; $R^I$ is selected from linear or branched hydrocarbon groups, linear or branched hydrocarbon groups that are partially or completely cyclized, linear or branched hydrocarbon groups that contain at least one heteroatom (for example, such as nitrogen, sulfur, oxygen, silicon, or halogen), linear or branched hydrocarbon groups that are partially or completely cyclized and that contain at least one heteroatom (for example, such as nitrogen, sulfur, oxygen, silicon, or halogen), and combinations thereof; A is a nitrogen atom or a $CR^{IIa}$ group; B is a nitrogen atom or a $CR^{IIIa}$ group; and $R^{II}$, $R^{III}$, $R^{IIa}$, and $R^{IIIa}$ and R are independently selected from hydrogen and the groups listed above for $R^I$.

Preferably, $R^I$ is selected from linear or branched alkyl (for example, methyl, ethyl, isopropyl, or tert-butyl), alkenyl, and alkynyl groups that are optionally substituted (for example, with at least one perfluoroalkyl group); linear or branched perfluoroalkyl groups; cycloalkyl groups that are optionally substituted (for example, with at least one alkyl or alkoxy group; preferably, alkyl; more preferably, isopropyl or tert-butyl); aryl groups that are optionally substituted (for example, with at least one alkyl or alkoxy group; preferably, alkyl; more preferably, isopropyl or tert-butyl); alkaryl and aralkyl groups (for example, such groups having from one to about 3 carbon atoms in the alkyl portion) in which the aryl portion is optionally substituted (for example, with at least one alkyl or alkoxy group; preferably, alkyl; more preferably, isopropyl or tert-butyl); and combinations thereof. More preferably, $R^I$ is selected from linear or branched (preferably, branched) alkyl groups that are optionally substituted, aryl groups that are optionally substituted, alkaryl groups in which the aryl portion is optionally substituted, and combinations thereof (even more preferably, $R^I$ is selected from aryl groups that are optionally substituted, alkaryl groups in which the aryl portion is optionally substituted, and combinations thereof; most preferably, $R^I$ is selected from aryl groups that are optionally substituted (preferably, unsubstituted) and combinations thereof). $R^I$ preferably has from one to about 18 carbon atoms (more preferably, from one to about 12 carbon atoms; most preferably, from 3 to about 9 carbon atoms).

Other preferred classes of carbenes include those represented by the following general formulas (VI)

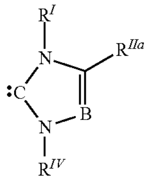

(VII)

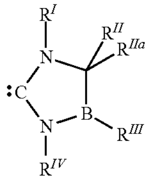

wherein B, $R^I$, $R^{II}$, $R^{IIa}$, and $R^{III}$ are as defined for Formulas IV and V above; and $R^{IV}$ is selected from linear or branched hydrocarbon groups, linear or branched hydrocarbon groups that are partially or completely cyclized, linear or branched hydrocarbon groups that contain at least one heteroatom (for example, such as nitrogen, sulfur, oxygen, silicon, or halogen), linear or branched hydrocarbon groups that are partially or completely cyclized and that contain at least one heteroatom (for example, such as nitrogen, sulfur, oxygen, silicon, or halogen), and combinations thereof.

Preferably, $R^{IV}$ is selected from linear or branched alkyl (for example, methyl, ethyl, isopropyl, or tert-butyl), alkenyl, and alkynyl groups that are optionally substituted (for example, with at least one perfluoroalkyl group); linear or branched perfluoroalkyl groups; cycloalkyl groups that are optionally substituted (for example, with at least one alkyl or alkoxy group; preferably, alkyl; more preferably, isopropyl or tert-butyl); aryl groups that are optionally substituted (for example, with at least one alkyl or alkoxy group; preferably, alkyl; more preferably, isopropyl or tert-butyl); alkaryl and aralkyl groups (for example, such groups having from one to about 3 carbon atoms in the alkyl portion) in which the aryl portion is optionally substituted (for example, with at least one alkyl or alkoxy group; preferably, alkyl; more preferably, isopropyl or tert-butyl); and combinations thereof. More preferably, $R^{IV}$ is selected from linear or branched (preferably, branched) alkyl groups that are optionally substituted, aryl groups that are optionally substituted, alkaryl groups in which the aryl portion is optionally substituted, and combinations thereof (even more preferably, $R^{IV}$ is selected from aryl groups that are optionally substituted, alkaryl groups in which the aryl portion is optionally substituted, and combinations thereof; most preferably, $R^{IV}$ is selected from aryl groups that are optionally substituted (preferably, unsubstituted) and combinations thereof). $R^{IV}$ preferably has from one to about 18 carbon atoms (more preferably, from one to about 12 carbon atoms; most preferably, from 3 to about 9 carbon atoms).

The carbenes represented by Formulas VI and VII are particularly preferred (especially those of Formula VI wherein B is nitrogen or comprises carbon, and those of Formula VII wherein B comprises carbon). More preferred are the carbenes of Formula VI (most preferably, the carbenes of Formula VI wherein B is nitrogen).

Carbenes such as those described above can be pre-formed and stored in an inert and unreactive (generally anhydrous) atmosphere (for example, stored under nitrogen or argon in a solvent medium such as toluene). (See, for example, "Efficient Transesterification/Acylation Reactions Mediated by N-Heterocyclic Carbene Catalysts" by G. A. Grasa et al., J. Org. Chem 68, 2812 (2003), which describes the use of stable carbenes as catalysts for esterifications.) Some such carbenes (for example, TPT (also known as Ender's carbene), 1,3,4-triphenyl-4,5-dihydroimidazol-2-ylidene) are commercially available.

Alternatively (and preferably), the carbenes can be formed in situ, for example, by thermolysis, treatment with base, or photolysis of at least one carbene precursor. Useful carbene precursors include carbene dimers, carbene salts (for example, carbene imidazolium salts), carbene adducts (for example, adducts of carbenes and compounds such as alcohols, chloroform, pentafluorobenzene, and the like, and combinations thereof).

Suitable carbene dimers include those that can be split into two carbenes by thermolysis (thermal activation by application of heat; for example, activation at temperatures of about 100° C. to about 150° C.) or by photolysis (photoactivation by exposure to, for example, ultraviolet (UV) light using known sources and techniques). Useful carbene dimers include those that are represented by the following general formula (VIII)

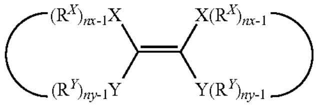

wherein X, Y, nx, ny, $R^X$, and $R^Y$ are as defined above for Formula III. Such carbene dimers can be prepared by known methods (including, for example, those described by H. Wanzlick in *Organic Syntheses*, Coll. Vol. 5, page 115 (1973)).

Suitable carbene salts include those that form a carbene by reaction with at least one base (for example, a tertiary amine such as triethylamine, an alcoholate such as potassium tert-butoxide (tBuOK), or an alkyl lithium such as butyl lithium). Useful carbene salts include those that comprise at least one of the above-described carbenes and at least one anion of an organic or inorganic Bronsted acid (a protic acid; preferably, a protic acid exhibiting a pKa (measured in water) of less than about 6; more preferably, a pKa of less than about 4; most preferably, a pKa of less than about 2).

Useful bases include those of sufficient strength to deprotonate the carbene salt. Preferred bases include alkali metal hydrides (for example, sodium hydride), alkali metal carboxylates, alkali metal alkoxides (for example, sodium methoxide or potassium tert-butoxide), alkali metal amides (for example, lithium diisopropylamide), and combinations thereof. The deprotonation reaction preferably is carried out in at least one solvent in which the carbene salt and the base (preferably, used in an amount of at least one equivalent) are at least partially soluble (for example, cyclic or noncyclic ethers) and/or at a temperature in the range of about 0 to about 80° C.

Preferred carbene salts include those that are represented by the following general formulas (IX)

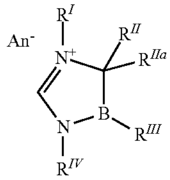

(X)

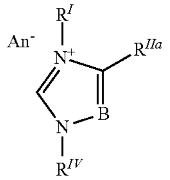

wherein B, $R^I$, $R^{II}$, $R^{III}$, $R^{IV}$, and $R^{IIa}$ are as defined above for Formulas VI and VII; and $An^-$ is an anion derived from at least one Bronsted acid (for example, an anion selected from carboxylate (for example, acetate, benzoate, or stearate), sulfate, hydrogen sulfate, sulfonate (for example, benzenesulfonate), phosphate, hydrogen phosphate, phosphonate (for example, phenylphosphonate), halide (for example, chloride or iodide), perchlorate, borate, tetrafluoroborate, hexafluorophosphate, and combinations thereof). Preferred anions include halide, tetrafluoroborate, hexafluorophosphate, and combinations thereof.

Such carbene salts can be prepared by known methods (for example, including the methods described in U.S. Patent Application Publication No. US 2009/0299024 (Baceiredo et al.) and the references cited therein, the descriptions of the methods being incorporated herein by reference). Some carbene salts (for example, vitamin B1) are commercially available.

Suitable carbene adducts include those that release carbene when subjected to thermolysis (thermal activation at, for example, temperatures in the range of about 50 to about 120° C.) or photolysis (photoactivation by exposure to, for example, ultraviolet (UV) light using known sources and techniques). Useful carbene adducts include adducts of the above-described carbenes and at least one compound (RQ-H) that has a weakly acidic hydrogen (for example, having a pKa greater than about 10; preferably, at least one compound selected from alcohols, chloroform, bromoform, pentafluorobenzene, and combinations thereof).

Preferred carbene adducts include those that are represented by the following general formula (XI)

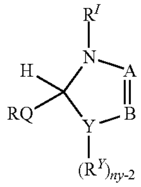

wherein A, B, $R^I$, Y, ny, and $R^Y$ are as defined above for Formula V; and RQ is selected from $CCl_3$, $CBr_3$, $C_6H_5O$, $CH_3O$, $CH_3CH_2O$, pentafluorophenyl, $CH_3S$, $CH_3CH_2S$, $CH_3NH$, $CH_3CH_2NH$, and combinations thereof.

Such carbene adducts can be prepared by known methods (for example, including the methods described by S. Csihony et al. in "Single-Component Catalyst/Initiators for the Organocatalytic Ring-Opening Polymerization of Lactide," J. Am. Chem. Soc. 125, 9079-9084 (2005), and the references cited therein, the descriptions of the methods being incorporated herein by reference). Some carbene adducts (for example, 5-methoxy-4,5-dihydro-1H-1,3,4-triphenyl-1,2,4-triazoline (5MeO-TPT)) are commercially available.

Preferred carbene precursors include carbene adducts (more preferably, adducts of carbene and at least one alcohol; even more preferably, adducts of carbene and at least one alkanol; most preferably, adducts of carbene and methanol or ethanol). Particularly preferred are methanol adducts.

Representative examples of useful carbene precursors include dimers, salts, and adducts (preferably, dimers and adducts; more preferably, adducts; most preferably, alcohol adducts) of N-heterocyclic carbenes including imidazolinylidene, imidazolylidene, pyrazolylidene, triazolylidene, tetrazolylidene, pyrrolidinylidene, thiazolylidene, oxazolylidene, tetrahydropyrimidinylidene, perhydrobenzimidazolylidene, benzimidazolylidene, dihydropyrimidinylidene, dihydro-dibenzo-diazeninylidene, and the like, and combinations thereof. Preferred carbene precursors include dimers, salts, and adducts (preferably, dimers and adducts; more preferably, adducts; most preferably, alcohol adducts) of N-heterocyclic carbenes including imidazolinylidene, imidazolylidene, triazolylidene, tetrazolylidene, pyrazolylidene, pyrrolidinylidene, and combinations thereof; more preferably, of N-heterocyclic carbenes including imidazolinylidene, imidazolylidene, triazolylidene, and combinations thereof; even more preferably, of N-heterocyclic carbenes including triazolylidene and combinations thereof; most preferably, of

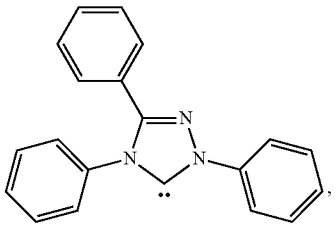

TPT (Ender's carbene)

and combinations thereof. Thus, particularly preferred carbene precursors include 5-methoxy-4,5-dihydro-1H-1,3,4-triphenyl-1,2,4-triazoline (5MeO-TPT), 4,5-dihydro-1H-1,3-diphenyl-2-methoxyimidazole, 4,5-dihydro-1H-1,3-dimesityl-2-ethoxyimidazole, 1H-1,3-dimesityl-2-methoxyimidazole, 1H-1,3-di-tert-butyl-2-methoxyimidazole, and combinations thereof (more preferably, 5-methoxy-4,5-dihydro-1H-1,3,4-triphenyl-1,2,4-triazoline (5MeO-TPT), 4,5-dihydro-1H-1,3-dimesityl-2-methoxyimidazole, and combinations thereof; most preferably, 5-methoxy-4,5-dihydro-1H-1,3,4-triphenyl-1,2,4-triazoline (5MeO-TPT)).

Preparation of Curable Compositions

The curable compositions of the invention comprise component (a), component (b), and a catalyst composition (c) (comprising at least one carbene, at least one carbene precursor, or a combination thereof). Preferably, the curable compositions consist essentially of these three components (a), (b), and (c) (that is, the curable compositions) preferably comprise only dehydrogenatively-curable polysiloxane components).

The curable compositions of the invention can be prepared by combining components (a), (b), and (c) in essentially any order (preferably, with agitation or stirring; generally under atmospheric pressure). When pre-formed carbene(s) (rather than carbene precursor(s)) are used, the combining of components preferably can be carried out in an inert atmosphere (for example, under nitrogen) to exclude or limit the presence of water and/or oxygen. Preferably, components (a) and (b) are combined initially, followed by addition of component (c). The composition can be maintained as a relatively shelf-stable, 2-part system (for example, by keeping component (c) separate from the other two components), if desired, but, when carbene precursors are utilized in component (c), a 1-part system (comprising all three components) can also be stable for periods of up to, for example, about two weeks in dry solvent (a relatively long pot life), prior to coating or other application of the composition.

The relative amounts of components (a) and (b) can vary widely, depending upon their nature and the desired properties of the curable and/or cured composition. Although stoichiometry prescribes a 1:1 molar ratio of reactive silane functionality (for example, one mole of hydrosilyl moieties for every mole of hydroxysilyl moieties), in practice it can be useful to have a deficiency or an excess of hydrosilyl functionality (for example, this can be useful when cure inhibitors are present). Molar ratios (of hydrosilyl moieties to hydroxysilyl moieties) up to, for example, about 8:1 or about 13:1 or even as high as about 35:1 can be useful. Component (c) (the catalyst composition) can be present in the curable compositions in amounts ranging from about 0.1 to about 10 weight percent (preferably, from about 0.1 to about 5 weight percent; more preferably, from about 0.5 to about 2 weight percent), based upon the total weight of components (a), (b), and (c).

Preferably, the curable compositions comprise at least one solvent or diluent (preferably, a substantially dry solvent or diluent) to aid in storage stability, mixing, and/or coating, particularly when components (a) and (b) are polymeric. Suitable solvents for use in the curable compositions of the invention include those that do not significantly affect the stability or efficacy of the carbene(s) and, preferably, that are relatively polar. Useful solvents include aprotic solvents such as aromatic solvents (for example, xylene, toluene, 1,2-dichlorobenzene, 1,3-dichlorobenzene, 1,4-dichlorobenzene, and the like, and mixtures thereof), ketones (for example, methyl ethyl ketone (MEK), cyclohexanone, and the like, and mixtures thereof), alkyl esters (for example, ethyl acetate, butyl acetate, and the like, and mixtures thereof), alkanes (for example, heptane, isoparaffinic hydrocarbons, and the like, and mixtures thereof), ethers (for example, t-butyl methyl ether, tetrahydrofuran (THF), and the like, and mixtures thereof), and the like, and mixtures thereof. Preferred solvents include aromatic solvents, alkanes, ketones, and mixtures thereof; with xylene, heptane, methyl ethyl ketone, and mixtures thereof being more preferred; and with methyl ethyl ketone and mixtures of methyl ethyl ketone and heptane being most preferred.

Minor amounts of optional components can be added to the curable compositions to impart particular desired properties for particular curing methods or uses. Useful compositions can comprise conventional additives such as, for example, catalysts (including conventional condensation catalysts such as tin catalysts, which can be added as co-catalysts if desired), initiators, emulsifiers (including surfactants), stabilizers, anti-oxidants, flame retardants, adhesion promoters, release modifiers (for example, silicate MQ resin), colorants, thickeners (for example, carboxy methyl cellulose (CMC), polyvinylacrylamide, polypropylene oxide, polyethylene oxide/ polypropylene oxide copolymers, polyalkenols), water scavengers, and the like, and mixtures thereof.

Use and Curing of Curable Compositions

The curable compositions of the invention can be used in various different applications. For example, the composition(s) can be used as sealants, release coatings, surface treatments, hardcoats, and the like. When used as fluorinated surface treatments, a degree of hydrophobicity and/or oleophobicity can be imparted to a variety of substrates (for example, for surface protection or to enhance ease of cleaning).

The curable compositions of the invention (or, alternatively, their components) can be applied to at least a portion of at least one major surface of a substrate (for example, a sheet, a fiber, or a shaped object) by essentially any known or hereafter-developed application method, so as to form a variety of different coated articles. The composition can be applied in essentially any manner (and with essentially any thickness) that can form a useful coating.

Useful application methods include coating methods such as dip coating, spin coating, spray coating, wiping, roll coating, wire coating, and the like, and combinations thereof. The composition can be applied in neat form or in the form of solvent solutions (for example, in solvents such as alkyl esters, ketones, alkanes, aromatics, and the like, and mixtures thereof) or emulsions. When solvent is used, useful concentrations of the composition can vary over a wide range (for example, from about 1 to about 90 weight percent), depending upon the viscosity of the composition, the application method utilized, the nature of the substrate, and the desired properties.

Substrates suitable for use in preparing the coated articles include those having at least one surface comprising a material that is solid and preferably substantially inert to any coating or application solvent that is used. Preferably, the curable compositions can adhere to the substrate surface through chemical interactions, physical interactions, or a combination thereof (more preferably, a combination thereof).

Suitable substrates can comprise a single material or a combination of different materials and can be homogeneous or heterogeneous in nature. Useful heterogeneous substrates include coated substrates comprising a coating of a material (for example, a metal or a primer) borne on a physical support (for example, a polymeric film).

Useful substrates include those that comprise wood, glass, minerals (for example, both man-made ceramics such as concrete and naturally-occurring stones such as marble and the like), polymers (for example, polycarbonate, polyester, polyacrylate, and the like) including multi-layer polymeric films, metals (for example, copper, silver, gold, aluminum, iron, stainless steel, nickel, zinc, and the like), metal alloys, metal compounds (for example, metal oxides and the like), leather, parchment, paper, textiles, painted surfaces, and combinations thereof. Preferred substrates include glass, minerals, wood, metals, metal alloys, metal compounds, polymers, paper, and combinations thereof (more preferably, paper, metals, metal alloys, metal compounds, polymers, and combinations thereof).

Preferred substrates include those used for pressure-sensitive adhesive (PSA) products. For example, the curable compositions can be applied to suitable flexible or inflexible backing materials and then cured. Useful flexible backing materials include paper, Kraft paper, polyolefin-coated paper, plastic films (for example, poly(propylene), poly(ethylene), poly(vinyl chloride), polyester (including poly(ethylene terephthalate), polyamide, cellulose acetate, and ethyl cellulose), and the like, and combinations thereof, although essentially any surface requiring release toward adhesives can be utilized. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. Primers (including surface treatments such as corona treatment) can be utilized, but they are not always necessary.

The curable compositions of the invention can provide coatings that are suitable for use in the manufacture of PSA-coated labels and tapes. The specific level of release provided upon curing can be controllably varied through variation in, for example, the weight percentage and molecular weight of component (a) of the composition, or through the addition of release modifiers (for example, silicate MQ resin), which also can be varied in nature and/or amount.

The curable compositions can be cured by concentration (for example, by allowing solvent evaporation). The preferred curing conditions will vary, depending upon the particular application and its accompanying requirements and conditions. Moisture can be present (in relatively small amounts) but generally is not necessary. Cure generally can be effected thermolytically at temperatures ranging from room temperature (for example, about 20-23° C.) up to about 60° C. with carbenes, and, with carbene precursors, at temperatures ranging from about 50° C. up to about 150° C. or more (preferably, temperatures of about 50° C. to about 125° C.; more preferably, about 50° C. to about 100° C.; most preferably, about 50° C. to about 80° C.). Alternatively, cure can be effected by photolysis of carbene precursors with UV light (using known sources and techniques) or by treatment of carbene precursors with base, as described above. Curing times can range from a few minutes (for example, at room temperature) to hours (for example, under low catalyst conditions).

Release coatings obtained via cure of the curable compositions of the invention generally contain little or no free silicone to adversely affect the tack and peel properties of PSAs that come in contact with them. The curable compositions of the invention can cure relatively rapidly to provide relatively firmly anchored, highly crosslinked, solvent-resistant, tack-free coatings, which can be used with a broad range of PSA types (for example, acrylates, tackified natural rubbers, and tackified synthetic elastomers).

Articles in the form of PSA laminates (for example, comprising a layer of PSA borne on a release liner) can be prepared by placing a PSA layer in contact with the release coating through dry lamination, wet solution casting, or even by application of a photopolymerizable composition to the release coating, followed by irradiation to effect photopolymerization (for example, as described in U.S. Pat. No. 4,181,752 (Martens et al.), the description of which is incorporated herein by reference). Such articles can exhibit relatively good storage stability (as evidenced, for example, by the results of room temperature and/or heat accelerated aging tests to evaluate any change in the level of release (peel force) from the release coating and/or in the subsequent level of adhesion to a desired substrate).

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis.

| Material | Description | Source |
|---|---|---|
| Syl-Off™ 292 | A 30 weight percent solids dispersion of a blend of reactive hydroxysilyl-functional siloxane polymer(s) (said to comprise hydroxyl-terminated polydimethylsiloxane) and hydrosilyl-functional polysiloxane crosslinker (said to comprise poly(methyl)(hydrogen)siloxane) in xylene. This product is designed to provide premium release in most applications and is sold under the trade designation "Syl-Off™ 292." | Dow Corning Corporation, Midland, MI. |
| Syl-Off™ 2792 | A 32 weight percent solids dispersion of a blend of reactive silanol terminated siloxane polymers in toluene, trade designation "Syl-Off™ 2792." | Dow Corning Corporation, Midland, MI. |
| Syl-Off™ 7048 | Hydrosilyl-functional polysiloxane crosslinker, trade designation "Syl-Off™ 7048 Crosslinker." | Dow Corning Corporation, Midland, MI. |
| 1,3,4-Triphenyl-4,5-dihydroimidazol-2-ylidene (TPT (Ender's carbene)) | 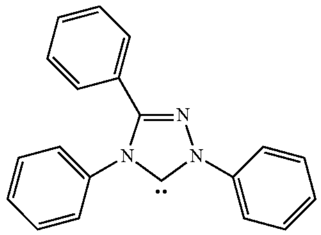 | Acros Organics, Geel, Belgium. |
| 5-Methoxy-4,5-dihydro-1H-1,3,4-triphenyl-1,2,4-triazoline (5MeO-TPT) | | Acros Organics, Geel, Belgium. |
| Benzanilide | | Pfaltz & Bauer, Waterbury, CT |
| Thionyl Chloride | | Alfa Aesar, Ward Hill, MA |
| Ethyl Acetate | | Alfa Aesar |
| Phenylhydrazine | | Alfa Aesar |
| Triethylamine | | Alfa Aesar |
| Isopropanol | | Alfa Aesar |
| Acetic Acid | | Alfa Aesar |
| Acetic Anhydride | | Alfa Aesar |
| Formic Acid | | Alfa Aesar |
| Methanol | | Alfa Aesar |
| NaOMe | 25 weight percent sodium methoxide in methanol. | Alfa Aesar |
| Heptane | | EMD, Gibbstown, NJ |
| MEK | Methyl Ethyl Ketone | EMD, Gibbstown, NJ |
| MIBK | Methyl Isobutyl Ketone | |
| Deuterated Pyridine | | Sigma-Aldrich Chemical Company, St. Louis. MO. |
| CrAcAc | Chromium Acetylacetonate | Sigma-Aldrich Chemical Company, St. Louis. MO. |
| Deuterated Toluene | | Sigma-Aldrich Chemical Company, |

-continued

| Material | Description | Source |
|---|---|---|
| | | St. Louis. MO. |

Test Methods $^{13}C$ and $^{1}H$ and $^{29}Si$ Nuclear Magnetic Resonance (NMR) Analysis The sample was swollen in deuterated chloroform (gel) with CrAcAc added as a relaxation agent. $^{13}C$ NMR spectra were acquired on a Bruker AVANCE™ 500 MHz NMR spectrometer obtained from Bruker AXS Inc., Madison, Wis. $^{1}H$ NMR spectra were acquired on a Varian INOVA™ 500 MHz spectrometer obtained from Agilent Technologies, Inc., Santa Clara, Calif. $^{29}Si$ NMR spectra were acquired using a Varian INOVA™ 500 MHz spectrometer (obtained from Agilent Technologies, Inc., Santa Clara, Calif.), which was equipped with a silica-free background and a 12 mm NMR probe.

Silicone Coating Weight Determination

Coating weights were determined by punching samples (about 3.69 cm in diameter) of coated and uncoated substrates and then comparing the weight differences between the resulting coated and uncoated samples using an energy dispersive X-ray fluorescence (EDXRF) spectrophotometer (obtained from Oxford Instruments, Elk Grove Village, Ill. under the trade designation OXFORD LAB X3000).

Percent Extractable Silicone Determination

The percentage of extractable silicone (that is, unreacted silicone), a measure of the extent of silicone cure on a release liner, was measured by the following method within 15 minutes after coating (of curable silicone compositions, as described in the Examples and Comparative Examples below) and again after 7 days.

Extractables were measured on cured thin film formulations to ascertain the extent of silicone crosslinking. The initial coating weight of a 2.54 cm diameter sample of coated substrate was determined according to the Silicone Coating Weight Determination procedure described above. The coated sample was then dipped and shaken in methyl isobutyl ketone (MIBK) for 5 minutes, was removed, and was allowed to dry. The coating weight of the removed sample was then measured again (to obtain a final coating weight), and the resulting difference between the initial and final coating weights was recorded as the percentage of extractable silicone.

Percent Extractable Silicone was calculated using the following formula:

$$[(a-b)/a]\times 100=\text{Percent Extractable Silicone}$$

where a=initial coating weight (before extraction with MIBK)

where b=final coating weight (after extraction with MIBK)

Test Methods for Measuring Aged Release (Release Liner Adhesion) and Subsequent Adhesion (Readhesion)

These tests measured the effectiveness of release liners that had been aged for a period of time at a constant temperature and relative humidity. The aged release value is a quantitative measure of the force required to remove a flexible adhesive tape from the release liner at a specific angle and rate of removal. This force is expressed in Newtons per decimeter (N/dm). Unless otherwise noted, one of the following three adhesive tapes was used to measure the aged release value (release liner adhesion) and the subsequent adhesion (sometimes called readhesion) to a substrate.

Tape I is an acrylic pressure-sensitive adhesive tape comprising a polypropylene backing commercially available from 3M Company, St. Paul, Minn. under the trade designation Scotch™ Magic™ Tape 810.

Tape II is an acrylic pressure-sensitive adhesive tape comprising a polypropylene backing commercially available from 3M Company, St. Paul, Minn. under the trade designation Scotch™ Book Tape 845.

Tape III is a rubber adhesive tape comprising a crepe paper backing commercially available from 3M Company, St. Paul, Minn. under the trade designation Scotch™ High-Performance Masking Tape 232.

Release liners (release-coated substrates) of the invention were tested for their aged release values by lamination of one of the above-described adhesive tapes, with the release coating of the release liner facing the adhesive-bearing side of the tape. The resulting laminates were cut into test strips about 2.54 cm wide and approximately 12 cm long. The test strips were then aged for three days at a constant temperature and relative humidity (RH), as specified in the various examples below. The aged test strips were attached to the working platen of a slip/peel tester (IMASS Model SP2000, obtained from Instrumentors, Inc., Strongsville, Ohio) using a 2.54 cm wide double-coated adhesive paper tape (commercially available from 3M Company, St. Paul, Minn. under the trade designation 3M™ Double Coated Paper Tape 410B) applied to the release liner side of the test strip. The attached test strip was rolled once on the working platen with a 2 kg rubber roller. The adhesive tape of the test strip was then removed from the release liner by peeling at 180 degrees and a rate of 2.3 meters per minute (90 inches per minute), and the force required for removing the adhesive tape from the release liner was measured over a five-second data collection time.

All release tests were carried out in a facility at constant temperature (23° C.) and constant relative humidity (50 percent). At least two measurements were made for each example, and the data are reported as an average of all measurements. Measurements were made in grams-force/inch and converted to N/dm.

After peeling of the adhesive tape from the release liner, the subsequent (180 degree peel) adhesion of the adhesive tape was measured by adhering the freshly peeled adhesive tape (without the release liner) to a stainless steel test panel, with the adhesive-bearing side of the tape in contact with the panel. The adhered adhesive tape was rubbed down on the test panel, first using light thumb pressure and then with a 2 kg rubber roller at a rate of 61 cm per minute. The subsequent adhesion value of the tape was then measured using the above-described instrument and test parameters. These measurements were taken to determine whether a drop in adhesion value occurred due to undesirable contamination of the adhesive surface by the release coating of the release liner. The subsequent adhesion test was also carried out at 23° C. and 50 percent relative humidity. At least two measurements were made for each example, and the data are reported as an average of all measurements. Measurements were made in grams-force/inch and converted to N/dm.

Preparation of 5-Methoxy-4,5-dihydro-1H-1,3,4-triphenyl-1,2,4-triazoline (5MeO-TPT)

5MeO-TPT was prepared by a modified version of the routes described by D. Enders et al. in Synthesis 2003, page 1292, and by K. Potts et al. in J. Org. Chem. 32, page 224. A mixture of 98.6 g (0.5 mol) benzanilide and 75 mL (1.0 mol) thionyl chloride was heated on steam for 20 hours after initial vigorous outgassing. The resulting mixture was then stripped at about 26.67 kPa (20 mmHg) and 60° C. for 3 hours, leaving 108.4 g of N-phenylbenzimidoyl chloride as a low-melting green solid. The solid was dissolved in 250 mL ethyl acetate and stirred at 5° C. while adding a mixture of 54.05 g (0.5 mol) phenylhydrazine and 51.0 g (0.5 mol) triethylamine dropwise, with the temperature of the solution slowly rising to 20° C. The resulting mixture was washed with 1000 mL of 2 weight percent acetic acid. Solid product was present and another 400 mL of ethyl acetate was added to the washed mixture, with some solid still observed. The ethyl acetate portion of the mixture was separated and filtered, yielding 25.1 g of desired product, and the resulting mother liquor was stripped, 150 mL isopropanol and 50 mL water were added, and the resulting solid was filtered and dried to provide 35.9 g initially and 4.4 g as the final crop, for a total yield of 65.4 g (0.227 mol, 46 percent) of N-phenylbenzamide phenylhydrazone as a brown solid.

A 1 L flask was charged first with 330 mL acetic anhydride and then 167 mL formic acid. The resulting stirred mixture warmed (exothermed) to 65° C. in 2 minutes, at which point cooling with an ice bath was begun. After 2 minutes, the ice bath was removed (temperature=65° C.), and the mixture was allowed to further cool to 22° C. over one hour. Addition of 57.3 g (0.193 mol) N-phenylbenzamide phenylhydrazone to the cooled mixture caused a slight exotherm over two hours (27° C.). After stirring for 20 hours, the mixture was stripped at about 26.67 kPa (20 mmHg) and 80° C. for nine hours to leave 107.5 g brown oil. This oil was dissolved in 250 mL methanol, chilled with an ice-salt bath to 1° C., and treated with 240 g of 25 weight percent NaOMe in methanol (1.1 mol). After the addition of NaOMe, the resulting mixture was allowed to warm to 22° C. and was then filtered to provide 66.0 g of 5Meo-TPT as a tan solid. This solid was heated at 65° C. with 800 mL methanol, filtered to remove 12.0 g tan powder, and cooled to yield 11.9 g brown crystals (melting point (mp) of 112-117° C., yield 23.9 g (0.073 mol, 38 percent)). The product was confirmed to be 5MeO-TPT by NMR analysis.

Example 1

A sample (Example 1A) was prepared by mixing 0.10 g 5MeO-TPT (prepared essentially as described above), 3.4 g MEK, 13.5 g Heptane, 0.20 g Syl-Off™ 7048, and 7.81 g Syl-Off™ 2792 in a glass vial. The vial was capped and set aside. The next day a portion of the resulting mixture was poured into a glass Petri dish and baked for over 2 hours at 80° C.

A second sample (Example 1B) was prepared by mixing 0.10 g 5MeO-TPT (prepared essentially as described above), 3.4 g MEK, 13.5 g Heptane, 0.20 g Syl-Off™ 7048, and 7.81 g Syl-Off™ 2792 in a second glass vial. A portion of the resulting mixture was poured into a glass Petri dish and baked for over 2 hours at 80° C.

Each baked sample was then swollen in deuterated chloroform with CrAcAc added as a relaxation agent, and $^{29}$Si NMR spectra were acquired. For both samples, resonances were observed at about −22 ppm (main chain D-group), −36 ppm (Si—H functionality), and −65 ppm (T-group cross-link). No resonance was observed at −12 ppm for Si—OH functionality, indicating that the carbene (produced in situ by thermolysis of the carbene precursor 5MeO-TPT) catalyzed the dehydrogenative curing reaction Si—OH+Si—H=Si—O—Si to form cross-linked silicones.

Example 2

Approximately 7.0 g of Syl-Off™ 292 (a 30 weight percent solids dispersion of a blend of reactive hydroxysilyl-functional siloxane polymer(s) (said to comprise hydroxyl-terminated polydimethylsiloxane) and hydrosilyl-functional polysiloxane crosslinker (said to comprise poly(methyl)(hydrogen)siloxane) in xylene (a premium release coating composition obtained from Dow Corning Corporation, Midland, Mich., under the trade designation Syl-Off™ 292) was weighed into a Schlenk flask. 7.0 g of Syl-Off™ 292 contains about 2.1 g of the above-mentioned polymer blend. The polymer dispersion was degassed under vacuum for approximately 30-60 seconds and then transferred to a glove box under inert (nitrogen gas) conditions. Approximately 30 mg of a stable carbene (1,3,4-triphenyl-4,5-dihydroimidazol-2-ylidene) was weighed out in a vial to provide about 1.5 weight percent carbene catalyst to polymer solids. The polymer dispersion was poured into the vial and mixed with a glass rod. After mixing, a portion of the contents of the vial was poured into a Petri dish. The Petri dish was left in the glove box overnight, resulting in a film in the Petri dish the next day that appeared (visually) to be cured but was slightly smearable.

Some of the film was scraped from the Petri dish and swollen in deuterated toluene. CrAcAc was added as a relaxation agent for $^{29}$Si NMR data acquisition, and $^{29}$Si NMR spectra were acquired. Resonances were observed at about −22 ppm (main chain D-group), −36 ppm (Si—H functionality), and −65 ppm (T-group cross-link) in the resulting NMR spectra. No resonance was observed at −12 ppm for Si—OH functionality, indicating that the pre-formed carbene (1,3,4-triphenyl-4,5-dihydroimidazol-2-ylidene) had catalyzed the dehydrogenative curing reaction Si—OH+Si—H=Si—O—Si under anaerobic conditions to form cross-linked silicones.

Example 3

A mixture of 0.10 g 5MeO-TPT (prepared essentially as described above), 3.4 g MEK, 13.5 g Heptane, 0.20 g Syl-Off™ 7048, and 7.81 g Syl-Off™ 2792 was prepared in an 11 dram glass vial. The mixture was coated on the primed side of a 50 micrometer thick polyester terephthalate (PET) film (obtained from Mitsubishi Polyester Film, Greer, S.C., under the trade designation Hostaphan™ 3 SAB, referred to hereinafter as 3 SAB PET film, which has one side chemically treated or primed to improve the adhesion of silicone coatings) using a number 4 Meyer rod. The resulting coated film was then placed in an oven and cured at 80° C. for 2 minutes. The resulting coating was cured well and could not be scuffed off with finger pressure. The coating was found to contain 8.8 percent extractable silicone by the methods described above.

Samples of the cured coated film were tested for release liner adhesion and subsequent adhesion (readhesion) using the methods and adhesive tapes described above, after aging for 3 days at room temperature (RT; 23° C.) and at a relative humidity (RH) of 50 percent. Other samples of the cured coated film were aged in an oven at 70° C. for 3 days and then cooled to RT under a RH of 50 percent before such testing. The resulting test data are presented below in Table 1.

TABLE 1

| | Release Liner Adhesion (N/dm) | | Readhesion (N/dm) | |
|---|---|---|---|---|
| Tape | Aging at 23° C. | Aging at 70° C. | Aging at 23° C. | Aging at 70° C. |
| Tape I | 0.27 | 0.58 | 18.49 | 18.99 |
| Tape II | 0.31 | 0.73 | 30.14 | 23.17 |
| Tape III | 0.21 | 0.96 | 40.63 | 47.73 |

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows.

We claim:

1. A curable composition comprising (a) at least one polyorganosiloxane, fluorinated polyorganosiloxane, or combination thereof comprising reactive silane functionality comprising at least two hydroxysilyl moieties;

(b) at least one polyorganosiloxane, fluorinated polyorganosiloxane, or combination thereof comprising reactive silane functionality comprising at least two hydrosilyl moieties; and (c) a catalyst composition comprising at least one carbene;

wherein at least one of said components (a) and (b) has an average reactive silane functionality of at least three; and wherein said composition is an organometallic catalyst-free composition.

2. The composition of claim 1, wherein said components (a) and (b) each comprise at least one polyorganosiloxane.

3. The composition of claim 1, wherein said component (a) is hydroxyl-endblocked.

4. The composition of claim 1, wherein said component (a) is selected from polysiloxanes that are represented by the following general formula:

$$(OH)_p—Si(R')_{3-p}\text{-}[G\text{-}Si(R')_2]_t—O—[(R')_2SiO]_q[Si(R')_2\text{-}G]_t\text{-}Si(R')_{3-p}—(OH)_p \quad (I)$$

wherein each p is independently an integer of 1, 2, or 3; each G is independently a divalent linking group; each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; q is an integer of 0 to 15,000; and each t is independently an integer of 0 or 1.

5. The composition of claim 1, wherein said component (b) has an average reactive silane functionality of at least three.

6. The composition of claim 1, wherein said component (b) is selected from polysiloxanes that are represented by the following general formula:

$$R'_2R''SiO(R'_2SiO)_r(HR'SiO)_sSiR''R'_2 \quad (II)$$

wherein each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; each R'' is independently hydrogen or R'; r is an integer of 0 to 150; and s is an integer of 2 to 150.

7. The composition of claim 1, wherein said carbene is selected from those represented by the following general formula (III)

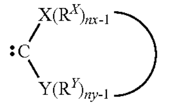

wherein X and Y are heteroatoms that are each independently selected from nitrogen, sulfur, phosphorus, silicon, boron, and oxygen; nx and ny are integers that are respectively equal to the valence of the heteroatom X and the valence of the heteroatom Y; each $R^X$ and each $R^Y$ is independently selected from linear or branched hydrocarbon groups, linear or branched hydrocarbon groups that are partially or completely cyclized, linear or branched hydrocarbon groups that contain at least one heteroatom, linear or branched hydrocarbon groups that are partially or completely cyclized and that contain at least one heteroatom, and combinations thereof; wherein one $R^X$ and one $R^Y$ optionally are bonded together to form a heterocycle with the heteroatoms X and Y and the divalent carbon atom having two non-bonding electrons.

8. The composition of claim 1, wherein said carbene is an N-heterocyclic carbene selected from imidazolinylidene, imidazolylidene, pyrazolylidene, triazolylidene, tetrazolylidene, pyrrolidinylidene, thiazolylidene, oxazolylidene, tetrahydropyrimidinylidene, perhydrobenzimidazolylidene, benzimidazolylidene, dihydropyrimidinylidene, dihydrodibenzo-diazeninylidene, and combinations thereof.

9. The composition of claim 1, wherein said carbene is selected from those represented by the following general formulas (IV)

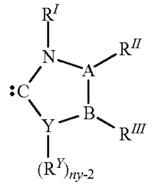

(V)

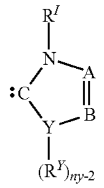

wherein Y is a heteroatom selected from nitrogen, sulfur, phosphorus, silicon, boron, and oxygen; $R^Y$ and $R^I$ are independently selected from linear or branched hydrocarbon groups, linear or branched hydrocarbon groups that are partially or completely cyclized, linear or branched hydrocarbon groups that contain at least one heteroatom, linear or branched hydrocarbon groups that are partially or completely cyclized and that contain at least one heteroatom, and combinations thereof; ny is an integer that is equal to the valence of the heteroatom Y; A is a nitrogen atom or a $CR^{IIa}$ group; B is a nitrogen atom or a $CR^{IIIa}$ group; and $R^{II}$, $R^{III}$, $R^{IIa}$, and $R^{IIIa}$ are independently selected from hydrogen and the groups listed above for $R^{I}$.

10. The composition of claim 1, wherein said carbene is selected from those represented by the following general formulas (VI)

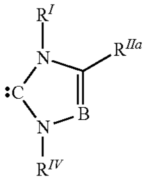

(VII)

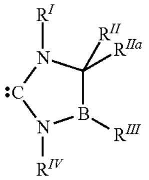

wherein B is a nitrogen atom or a $CR^{IIIa}$ group, $R^{I}$, $R^{II}$, $R^{IIa}$, $R^{III}$, $R^{IIIa}$ and $R^{IV}$ are selected from linear or branched hydrocarbon groups, linear or branched hydrocarbon groups that are partially or completely cyclized, linear or branched hydrocarbon groups that contain at least one heteroatom, linear or branched hydrocarbon groups that are partially or completely cyclized and that contain at least one heteroatom, and combinations thereof.

11. The composition of claim 1, wherein said carbene is generated in situ from at least one carbene precursor.

12. The composition of claim 11, wherein said carbene precursor is selected from carbene dimers, carbene salts, carbene adducts, and combinations thereof.

13. The composition of claim 11, wherein said carbene precursor is an adduct of at least one carbene and at least one alcohol.

14. The composition of claim 11, wherein said carbene precursor is 5-methoxy-4,5-dihydro-1H-1,3,4-triphenyl-1,2,4-triazoline (5MeO-TPT).

15. The composition of claim 1, wherein said composition has been cured.

16. A coating process comprising (a) providing the curable polysiloxane composition of claim 1;

(b) providing at least one substrate having at least one major surface;

(c) applying said curable polysiloxane composition to at least a portion of at least one said major surface of said substrate; and (d) allowing or inducing said curable polysiloxane composition to cure to form a coating.

17. An article comprising at least one substrate having at least one major surface, said substrate bearing, on at least a portion of at least one said major surface, a coating prepared by the coating process of claim 16.

18. An article comprising a cured curable composition, wherein the curable composition is the composition of claim 1.

19. A curable composition comprising (a) at least one polyorganosiloxane, fluorinated polyorganosiloxane, or combination thereof that is hydroxyl-endblocked;

(b) at least one polyorganosiloxane, fluorinated polyorganosiloxane, or combination thereof comprising at least three hydrosilyl moieties; and (c) a catalyst composition comprising at least one N-heterocyclic carbine; wherein the composition is an organometallic catalyst-free composition.

20. A curable composition comprising (a) at least one polyorganosiloxane, fluorinated polyorganosiloxane, or combination thereof comprising reactive silane functionality comprising at least two hydroxysilyl moieties;

(b) at least one polyorganosiloxane, fluorinated polyorganosiloxane, or combination thereof comprising reactive silane functionality comprising at least two hydrosilyl moieties; and (c) a catalyst composition comprising at least one carbene precursor;

wherein at least one of said components (a) and (b) has an average reactive silane functionality of at least three.

* * * * *

UNITED STATES PATENT AND TRADEMARK OFFICE

CERTIFICATE OF CORRECTION

PATENT NO. : 9,006,336 B2
APPLICATION NO. : 14/368514
DATED : April 14, 2015
INVENTOR(S) : Yang et al.

It is certified that error appears in the above-identified patent and that said Letters Patent is hereby corrected as shown below:

Title Page, item (56)

Page 2, Column 2 (Other Publications)
Line 9, Delete "andO-alkylation" and insert -- and O-alkylation --, therefor.

Page 2, Column 2 (Other Publications)
Line 49, Delete "Tripheny1" and insert -- Triphenyl --, therefor.

In the Specification

Column 10
Line 28, Delete "$R^y$" and insert -- $R^Y$ --, therefor.

Column 11
Line 38, After "$R^{IIIa}$" delete "and R".

Column 13
Line 10, Delete "Chem" and insert -- Chem. --, therefor.

Column 23
Line 42, Delete "5Meo-TPT" and insert -- 5MeO-TPT --, therefor.

Column 24
Line 52, Delete "3 SAB," and insert -- 3SAB, --, therefor.

Column 24
Line 53, Delete "3 SAB" and insert -- 3SAB --, therefor.

Signed and Sealed this
Second Day of February, 2016

Michelle K. Lee
*Director of the United States Patent and Trademark Office*

In the Claims

Column 28
Line 28, In Claim 19, delete “carbine;” and insert -- carbene; --, therefor.